United States Patent [19]

Lachman

[11] Patent Number: 5,021,771
[45] Date of Patent: Jun. 4, 1991

[54] COMPUTER INPUT DEVICE WITH TWO CURSOR POSITIONING SPHERES

[76] Inventor: Ronald D. Lachman, 7702 W. Davis, Morton Grove, Ill. 60053

[21] Appl. No.: 204,629

[22] Filed: Aug. 9, 1988

[51] Int. Cl.$^5$ .............................. G09G 5/08
[52] U.S. Cl. ........................ 340/709; 340/711; 341/22; 273/148 B; 74/471 X Y
[58] Field of Search ........... 340/706, 709, 710, 711; 200/6 A, 6 R; 273/148 B; 250/221; 74/471 XY; 341/20, 22, 23-35

[56] References Cited

U.S. PATENT DOCUMENTS

| | | | |
|---|---|---|---|
| D. 278,709 | 5/1985 | Xanthopoulus | D14/100 |
| D. 285,201 | 8/1986 | Kim | D14/100 |
| D. 291,318 | 8/1987 | Kim | D14/114 |
| D. 291,574 | 8/1987 | Kim | D14/100 |
| 3,198,922 | 8/1965 | Rohacs | 200/157 |
| 3,931,486 | 1/1976 | Raetz | 200/157 |
| 4,369,439 | 1/1983 | Broos | 340/710 |
| 4,404,865 | 9/1983 | Kim | 273/148 B |
| 4,414,438 | 11/1983 | Maier et al. | 200/6 A |
| 4,469,330 | 9/1984 | Asher | 273/148 B |
| 4,476,954 | 10/1984 | Johnson et al. | 74/471 XY |
| 4,493,992 | 1/1985 | Geller | 273/148 B |
| 4,505,165 | 3/1985 | Wiczer | 74/471 XY |
| 4,538,476 | 9/1985 | Lugue | 273/148 B |
| 4,562,347 | 12/1985 | Hovey et al. | 250/221 |
| 4,575,086 | 3/1986 | Kim et al. | 273/148 B |
| 4,575,591 | 3/1986 | Lugaresi | 200/6 A |
| 4,581,609 | 4/1986 | Hosogoe et al. | 340/710 |
| 4,584,510 | 4/1986 | Hollow | 318/584 |
| 4,698,626 | 10/1987 | Sato et al. | 340/710 |
| 4,712,101 | 12/1987 | Culver | 340/710 |
| 4,722,416 | 2/1988 | Ahnafield | 74/471 XY |
| 4,724,715 | 2/1988 | Culver | 340/710 |
| 4,736,191 | 4/1988 | Matzke et al. | 341/20 |
| 4,799,049 | 1/1989 | Avila | 340/709 |
| 4,823,634 | 4/1989 | Culver | 340/710 |
| 4,835,528 | 5/1989 | Flinchbaugh | 340/710 |

OTHER PUBLICATIONS

IBM Technical Disclosure Bulletin, "Split Keyboard", vol. 29, No. 7, Dec. 1986, p. 3110.

Primary Examiner—Alvin E. Oberley
Assistant Examiner—Richard Hjerpe
Attorney, Agent, or Firm—Laubscher, Presta & Laubscher

[57] ABSTRACT

A cursor control and command input device for use with cathode ray tube displays is disclosed. The apparatus includes two cursor positioning spheres that are rotatably mounted within the reach of a user's thumbs without the user having to move his fingers from their current home position of the input device. In addition, devices for sensing the rotation of the spheres and generating output signals based upon such rotation is also provided. Command keys are also provided which are used in conjuction with the cursor positioning spheres to select various options or turn on and off the cursor positioning spheres and operated by the thumbs of the user without requiring that the user change the location of his fingers.

5 Claims, 2 Drawing Sheets

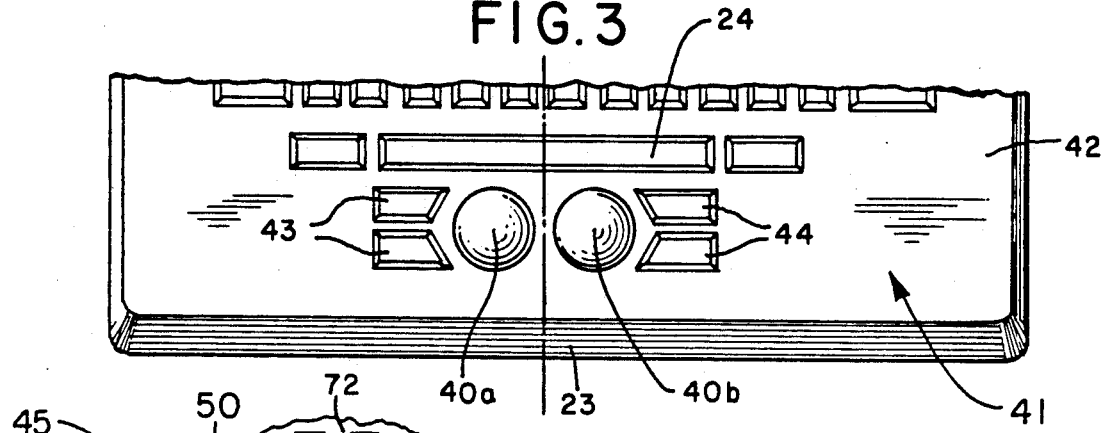
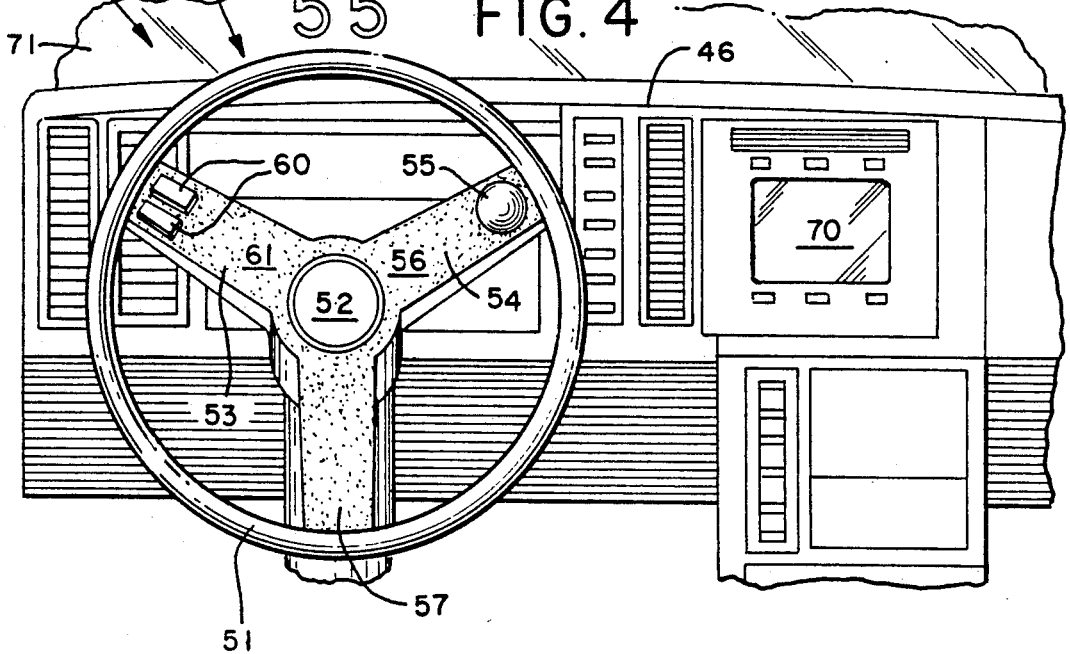
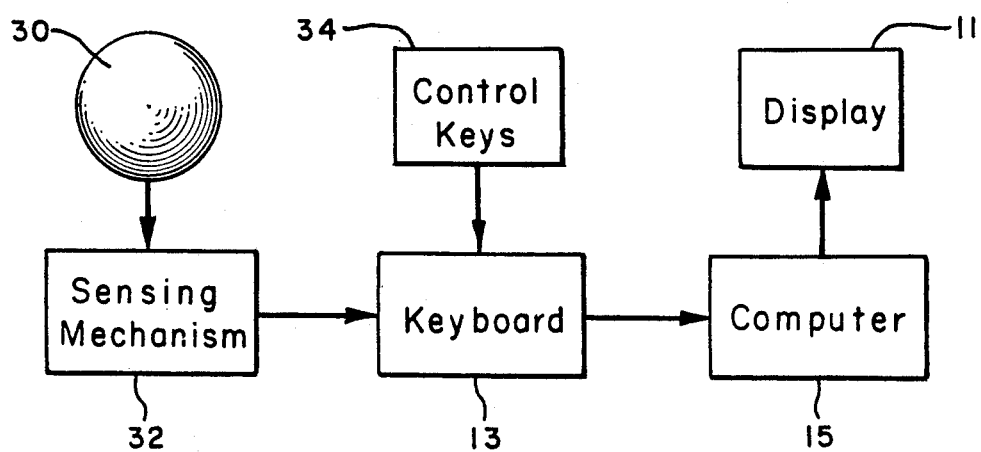

COMPUTER INPUT DEVICE WITH TWO CURSOR POSITIONING SPHERES

BACKGROUND AND SUMMARY OF THE INVENTION

The present invention generally relates to a graphical input device and, more particularly, to a device that permits a user to control cursor movement and other functions on a computer display without requiring the user to remove his hands from their position operating a computer, a vehicle or another device.

Various mechanisms for controlling cursor movements on a computer display screen are well known in the art. In general, conventional cursor control devices require a user to remove his hands from the "home" position on the keyboard in order to move the cursor. For example, a mouse is a small, hand-held device that requires its user to physically move the device over a surface in order to change the output signal created by the mouse.

Another common input device for controlling the movement of a cursor is a joystick. A joystick utilizes a lever that can be moved in various directions by the operator's hand and generates output signals representative of the x- and y-axis components of the direction and angle of inclination of the lever.

Still another type of input device is commonly referred to as a trackball. Trackballs typically include a rotatable sphere mounted within some type of housing so that a portion of the sphere projects above the housing in order to permit rotation of the sphere. Rotation of the sphere is monitored by a sensing device that translates the direction and magnitude of rotation of the sphere into a change in the output signal that results in movement of the cursor along the x- and y-axes, respectively. In the past, trackballs were designed and positioned for rotation by the palm and/or fingers of the user.

A "touch sensitive" display screen is another input device that can be utilized in some applications rather than those input devices listed above. Such screens display various functions or other types of information that can be selected merely by touching the appropriate location on the screen.

Each of these input devices, although useful for some applications, requires that the user remove his hand and fingers from the keyboard or other device in order to operate the input device. As a result, the user must abandon all other activities with one hand merely to move the cursor. The operator must substantially change the position of his hand and may have to direct his eyes to the location of the input device before operating the device. This creates certain inefficiencies inherent in the use of such a device. Furthermore, a device such as the mouse requires an additional surface upon which it is used. In some circumstances, such as when using a portable computer on an airplane, such a surface may not be available.

Some applications may exist in which a computer system user may wish more than two degrees of input. For example, when a computer system displays what appears to be a three-dimensional image on its display screen, the user may wish to move the cursor not only along the x- and y-axes of the screen, but also along what appears to be the z-axis into the screen. Thus, although the three-dimensional image is displayed on the two-dimensional surface of the screen, the user may desire to move the cursor both in the x-y plane and what appears to be the y-z plane. In addition, the user may desire to rotate an object that appears on the display. Thus, it would be desirable for an input device to have more than two degrees of input that can be used without the user having to remove his fingers from their current location on the keyboard.

Whereas removing one's hand from a computer keyboard in order to move a cursor creates certain inherent inefficiencies, removing one's hands from the controls during operation of other devices, such as an automobile and the like, is likely to create a safety hazard under certain conditions. Some automobiles now utilize a touch sensitive display for selecting various functions and options available to the driver such as, for example, heating and ventilating controls, radio controls, computer trip information and the like. Furthermore, as automobile computer systems become more advanced, more and more features such as power or economy tuning of the engine, four-wheel or two-wheel drive transmission, stiff or soft suspension, and window and sunroof controls, may be removed from their conventional locations spread throughout the interior of the automobile to one central location, the computer screen.

In order to operate such a touch sensitive display, the driver of the vehicle must direct his or her attention away from the road to the display screen. Then, in order to select a desired function or option, the driver must remove one hand from the steering wheel and touch the display screen. Because drivers typically position themselves within the automobile so that the steering wheel is located in a comfortable position, the location of the computer screen may require the driver to lean over towards the display screen in order to effectuate such a selection. By doing so, the driver is moving out of his normal driving position that presumably provides him with optimum control over the vehicle. If an emergency arises while the driver is out of his normal driving position, he may not be able to respond adequately. Accordingly, it would be advantageous for the driver to be able to select the various options and functions available to him without having to remove his hands from the steering wheel.

The graphical input devices of the present invention overcome the aforementioned shortcomings. In the cursor and input apparatus incorporating the principles of the present invention, the user may move a cursor on a display screen and select various options without moving his hand from its current position performing some other function.

One object of the present invention is to provide a cursor control and command input device that includes a central processing unit, a display screen and a keyboard. The keyboard has an upper surface and a plurality of rows of depressible type keys mounted on the keyboard whereby a portion of each type key projects above the upper surface to permit manual depression of each type key. The type keys are oriented for general operation of the keyboard from one side of the keyboard. One of the rows of type keys has "home" keys to which a user's fingers normally return while operating the computer system. A cursor positioning sphere is rotatably mounted on the keyboard so that a portion of the sphere projects above the upper surface of the keyboard to permit manual rotation of the sphere. A device for sensing rotation of the sphere and generating an output signal representative of the magnitude and direction of the rotation is also included. At least one depressible command key is mounted on the keyboard whereby a portion of each command key projects above the upper surface of the keyboard to permit manual depression of each command key. At least one of the command keys is positioned adjacent the cursor positioning sphere. The cursor positioning sphere is positioned so that the sphere can be rotated by either thumb of the user while the user's fingers remain on the home keys.

Another object of the present invention is to provide the aforementioned computer system in which the command keys are positioned to also permit the depression thereof by a thumb of the user while the user's fingers remain in contact with the home keys.

Still another object of the present invention is to provide the aforementioned computer systems that further include an elongated spacebar key located adjacent to one of the rows of type keys with the spacebar key having an axis parallel to the rows of the type keys. The cursor positioning sphere of such a system is positioned adjacent the spacebar key.

Still another object of the present invention is to provide the aforementioned computer systems in which an equal number of command keys are located on opposite sides of the cursor positioning sphere.

A further object of the present invention is to provide an input device for moving a cursor on a computer display screen that comprises a keyboard having an upper surface and a plurality of rows of depressible type keys mounted on the keyboard so that a portion of each type key projects above the upper surface of the keyboard to permit manual depression of each type key. The type keys are oriented for general operation of the keyboard from one side of the keyboard. One of the rows of type keys has "home" keys upon which a user's hands normally return while operating the input device. A first cursor positioning sphere is rotatably mounted on the keyboard so that a portion of the first sphere projects above the upper surface of the keyboard to permit manual rotation of the first sphere. A first sensing device for sensing rotation of the first sphere and generating an output signal representative of the magnitude and direction of the rotation is also provided. A second cursor positioning sphere is also rotatably mounted on the keyboard so that a portion of the second sphere projects above the upper surface of the keyboard to permit manual rotation of the second sphere. A second sensing device for sensing rotation of the second sphere and generating an output signal representative of the magnitude and direction of the rotation is also provided. The first and second spheres are positioned so that they can be rotated by either thumb of the user while the user's fingers remain in contact with the home keys.

Still another object of the present invention is to provide the aforementioned input device wherein the first cursor positioning sphere controls the cursor movement on the computer display screen in what appears to be the x-y plane and the second cursor positioning sphere controls the cursor movement on the computer display screen in what appears to be the y-z plane.

Still another principle object of the present invention is to provide the aforementioned input devices wherein the keyboard includes at least one command key mounted on the keyboard whereby a portion of each command key projects above the upper surface of the keyboard to permit manual depression of each command key.

Still another object of the present invention is to provide the aforementioned input devices wherein two command keys are positioned on the side of each cursor positioning sphere opposite the other cursor positioning sphere.

Still another object of the present invention is to provide the aforementioned input devices in which each command key is positioned so that it can be depressed by one of the thumbs of the user while the user's fingers remain in contact with the home keys.

Another object of the present invention is to provide a vehicle control system that includes a steering device for controlling the direction of travel of the vehicle and a computer system for controlling the vehicle functions and options. The computer system includes a display screen for displaying the vehicle functions and options. A cursor positioning sphere is rotatably mounted on the steering device so that a portion of the sphere projects above the surface of the steering device to permit manual rotation of the sphere. A device for sensing rotation of the sphere and generating an output signal representative of the magnitude and direction of the rotation is also provided. Rotation of the sphere causes a change in the output signal and thus moves a cursor on the display screen. At least one command key is mounted on the steering device whereby a portion of each command key projects above the surface of the steering device to permit manual depression of each command key in order to select a vehicle function or option. The cursor positioning sphere is positioned so that it can be rotated by one of the thumbs of the user while the user's hands remain in contact with the steering device.

Still another object of the present invention is to provide the aforementioned vehicle control system wherein the command keys are positioned to permit the user to depress the command keys while the user's fingers remain in contact with the steering device.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 3 is a partial top plan view of another embodiment of a keyboard incorporating the principles of the present invention;

FIG. 4 is a front elevation view of a steering wheel and dash board incorporating the principles of the present invention; and FIG. 5 is a diagrammatic view illustrating the cursor control and input device in operation with the computer system as shown in FIG. 1.

DETAILED DESCRIPTION OF THE PREFERRED EMBODIMENT

Figure 1:
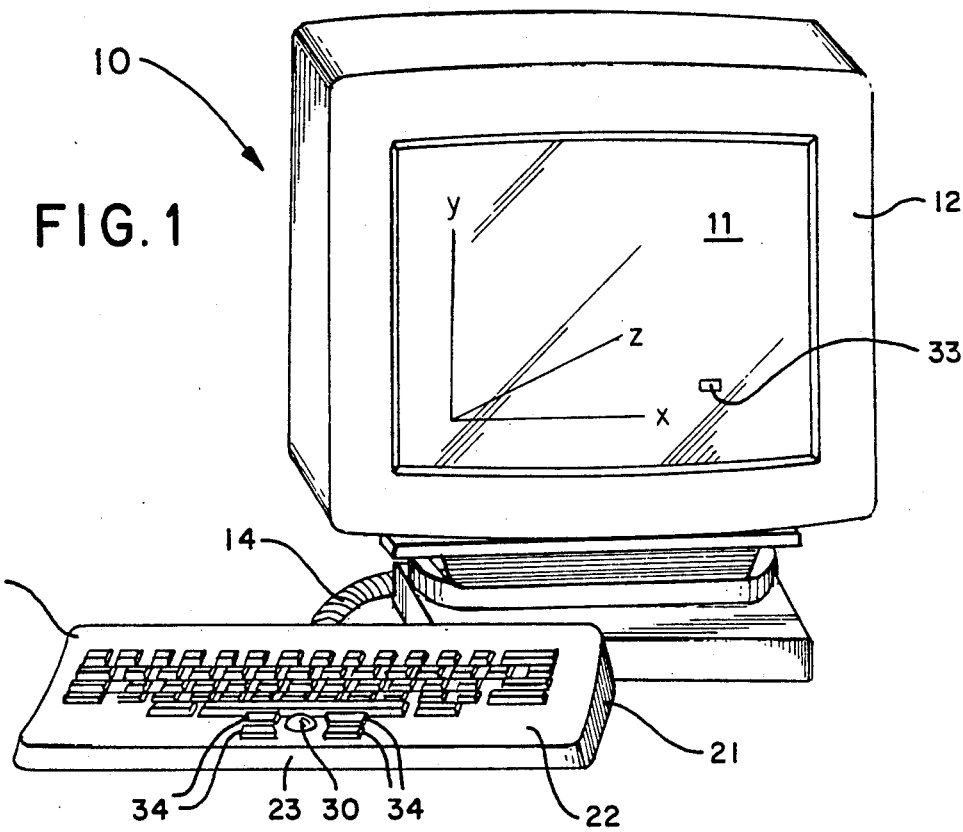
FIG. 1 is a perspective view of a computer system of the present invention.

Referring to the drawings and, in particular, to FIG. 1, a computer workstation is indicated generally at 10. Workstation 10 includes a cathode ray tube 11 operating as a computer display screen within a housing and pedestal 12. Keyboard 13 is connected by way of cord 14 to a central processing unit 15 (FIG. 5). Central processing unit 15 is connected to cathode ray tube 11 by a second cord (not shown). Such a workstation 10 could either be a stand alone system where each system has its own central processing unit 15 such as a personal computer or it could be driven by a central computer that controls more than one workstation.

Keyboard 13 includes a plurality of keys 16 mounted in a plurality of openings or apertures 20 in keyboard housing 21. A portion of these keys project above the upper surface 22 of housing 21 so that the user can depress the keys with his fingers. Keys 16 are oriented so as to face a user that is operating the keyboard while located generally adjacent side 23 of the keyboard 13. A spacebar key 24 is typically positioned between side 23 of the keyboard 13 and the row 25 of keys closest to the user. Spacebar key 24 is aligned so that its axial length is parallel to the axial length of row 25, both of which are perpendicular to the central axis 35 of keyboard 13.

In a standard Qwerty keyboard, the keys for letters a, s, d, f (indicated at 26a) and j, k, l and the semi-colon (indicated at 26b) are considered the "home" keys. Those are the keys upon which the user initially places his fingers when typing and to which the user returns his fingers after pressing a different key. Accordingly, the user initially places the fingers of his left hand on keys 26a and those of his right hand on keys 26b.

A small cursor positioning sphere or thumball 30 is mounted on keyboard 13 between spacebar key 24 and the side 23 of keyboard 13. Sphere 30 is positioned approximately equidistant between the sets of home keys for the left 26a and right 26b hands. Keyboard housing 21 has a round opening 31 through which a portion of sphere 30 projects above the upper surface 22 of housing 21 in order to allow the user to rotate the sphere.

A sensing mechanism 32 (FIG. 5) of known type monitors the magnitude and direction of rotation of sphere 30 and generates an output signal based thereon. This signal is passed by keyboard 13 through cord 14 and into the central processing unit 15 for processing. After processing, an appropriate signal is directed to cathode ray tube 11 whereby the cursor 33 is moved on the display screen.

In addition to sphere 30, control keys 34 also project upward through keyboard housing 21 so that a portion of those control keys extends above the upper surface 22 of housing 21. This allows the user to depress the control keys 34 as desired in order to activate or deactivate sphere 30 or for inputting other types of commands into the computer system shown in FIG. 5. These control keys are uniformly positioned around cursor positioning sphere 30.

By positioning cursor positioning sphere 30 along the central axis 35 of the keyboard 13 and adjacent spacebar key 24, the sphere 30 may be rotated by either the left or right thumb of a user without the user having to remove his fingers from home keys 26a and 26b. In addition, by providing control keys 34 on both sides of sphere 30, the user also has the option of rotating sphere 30 with either thumb and using his other thumb to depress control keys 34.

A second embodiment of the present invention utilizing two cursor control spheres 40a and 40b is indicated generally as 41 in FIG. 3. The keyboard 42 is identical to keyboard 13 (FIG. 1) except that cursor positioning sphere 30 has been replaced by two spheres 40a and 40b. A sensing mechanism 32 (FIG. 5) of known type is associated with each sphere 40a and 40b and monitors the rotation of its respective sphere and generates an output signal as described above with respect to sphere 30. By utilizing two spheres 40a and 40b, the user has two distinct two-dimensional input devices that work in unison to provide the use with many options as to the type of input utilized. For example, the user could utilize the left sphere 40a to control cursor movement along the x- and y-axes (FIG. 1) and the right sphere 40b to control cursor movement along the z-axis as well as permitting the rotation of objects on the display 11.

As with the keyboard 13 having only one cursor positioning sphere 30, keyboard 43 utilizes two pairs of control keys 43 and 44 positioned adjacent spheres 40a and 40b. These control keys 43 and 44 are identical in construction and operation to control keys 34 except that they are spaced further apart due to the additional space required for the additional cursor positioning sphere.

Cursor positioning spheres 40a and 40b are positioned so that the user can rotate either sphere 40a or 40b with either thumb without removing the fingers of that hand from the home keys 26a or 26b. Depending upon which thumb the user uses to rotate spheres 40a and 40b, he can use his other thumb to depress either control keys 43 or 44. In the alternative, the user could use his right thumb to rotate sphere 40b in conjunction with depressing control keys 43 with his left thumb. Likewise, the user would rotate sphere 40a with his left thumb and control keys 44 with his right thumb.

An automobile control system incorporating the principles of the present invention is indicated generally at 45 (FIG. 4). Such a system 45 includes a dashboard 46 and a steering wheel 50. The steering wheel 50 includes an outer ring 51 upon which the driver's hands are normally located. This outer ring is connected to a central section 52 by spokes 53, 54 and 57. The central section 52 of steering wheel 50 is connected to a center shaft (not shown) through which rotation of the steering wheel is transferred into a change in direction of the wheels (not shown) of the automobile.

A graphical input sphere 55 is mounted on one of the steering wheel spokes 54 with a portion of the sphere projecting out of the surface 56 of the spoke in order to permit the manual rotation of the sphere 55. This sphere 55 is positioned adjacent outer ring 51 in order to allow the driver to rotate sphere 55 without removing his hand or fingers from outer ring 51. As with the embodiments shown in FIGS. 1-3, spoke 54 includes a sensing mechanism 32 (FIG. 5) for sensing the rotation of the sphere 55. This sensing mechanism translates the rotation of sphere 55 into an output signal in the same manner as described above.

Control keys 60 are located on spoke 53 in order to permit the user to select various functions and commands as necessary. A portion of control keys 60 project out of the surface 61 of the spoke 53 in order to permit the depression of each control key. Control keys 60 are positioned on spoke 53 so that the user can depress the keys without removing his hand or fingers from the outer ring 51 of the steering wheel 50. An alternative location for placement of sphere 55 and control keys 60 would be to place either the sphere 55 or keys 60 or both in such a location on the steering wheel 50 that the user can rotate the sphere 55 or depress the control keys 60 with his fingers without removing his hands from the steering wheel.

A cathode ray tube 70 operating as a computer display screen is included on dashboard 46 and is capable of displaying various types of information, functions and options important to and available to the user. An alternative to a cathode ray tube display would be to use a "heads up" display whereby the image 71 that would be displayed on the cathode ray tube is instead projected up onto the lower section of the windshield 72. Such a display is low enough on the windshield not to obscure the driver's vision but does not require the driver to move his eyes as far from the road as the standard cathode ray tube in order to view the important information on the display.

In operation, a user utilizing workstation 10 will be seated in front of keyboard 13 and within view of cathode ray tube 11. In accordance with standard typing practice, the user typically places his fingers on home keys 26a and 26b from which he has access to all of the keys 16 on the keyboard 13. After typing a key, the user then returns his finger to the appropriate home key. By doing so, the user is always in a position to quickly type the next required letter.

Because of the location of the home keys 26a and 26b with respect to cursor positioning sphere 30, the sphere may be rotated by either thumb of the user without the user moving his fingers from the home keys 26a and 26b. By rotating sphere 30, the output signal generated by sensing mechanism 33 changes. The central processing unit 15 interprets this change in output signal and moves the cursor 33 on cathode ray tube 11. The user can then depress the appropriate control key 34 with his thumb that was not used to rotate sphere 30. Control keys 34 can be utilized to select the function upon which the cursor 33 is located, turn on and off the cursor positioning sphere 30 or many other functions. In addition, additional control keys may be provided as necessary for the particular application.

Some computer applications may exist in which the central processing unit 15 generates what appears to be a three-dimensional image on cathode ray tube 11. By utilizing keyboard 42 that includes two cursor positioning spheres 40a and 40b, the user is able to move the cursor 33 along both the x- and y-axes (FIG. 1) and along what appears to be the z-axis. In addition, the user can also rotate objects displayed on the display screen 11 around the various axes. The use of two spheres provides the user with the ability to independently control four different inputs that can be changed depending upon the application.

As with keyboard 13, the control keys 43 and 44 can be used for various functions. Because of the placement of spheres 40a and 40b and keys 43 and 44, such three-dimensional positioning may be performed without the user having to remove his fingers from home keys 26a and 26b. The user can move cursor 33 in three dimensions by using one thumb to rotate sphere 40a for x-y movement and using the same thumb to rotate sphere 40b for movement along the z-axis or another desired movement while the user's other thumb depresses control keys 43 or 44 as necessary. In the alternative, the user could use his right thumb to rotate sphere 40b in conjunction with depressing control keys 43 with his left thumb. Likewise, the user would rotate sphere 40a with his left thumb and control keys 44 with this right thumb.

Figure 2:
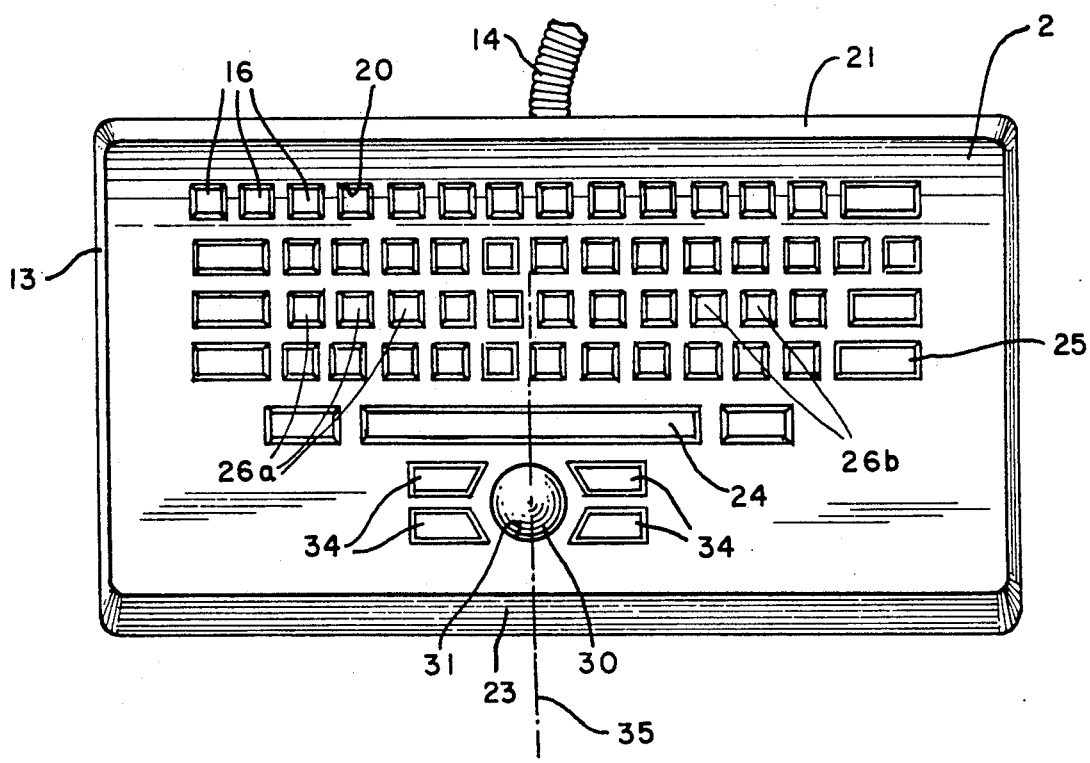
FIG. 2 is a top plan view of the keyboard shown in FIG. 1.

The operation of automobile control system 45 is similar to the operation of the embodiments shown in FIGS. 1-3 in that all of the embodiments permit the user to maintain his fingers in a location performing one function such as, for example, typing at a computer workstation or driving an automobile, while his thumbs are utilized to move a cursor on a display screen and select various options, features and other information. When operating the automobile control system 45, the driver typically drives the automobile with his hands located on outer ring 51 of steering wheel 50.

Graphic input sphere 55 is located on steering wheel spoke 54 so that the driver may rotate sphere 55 with his right thumb while the user's right hand and/or fingers thereon remain in contact with outer ring 51. By rotating sphere 55, the sensing mechanism 33 contained within spoke 54 generates an output signal that is transmitted to the central processing unit 15, which in turn generates a signal that moves the cursor on cathode ray tube 70.

Control keys 60 are likewise mounted on steering wheel spoke 53 in such a position that the driver can depress keys 60 with his left thumb while his right hand and/or fingers thereon remain in contact with outer ring 51. When the cursor has been moved to the desired position on cathode ray tube 70, the driver then depresses the desired key 60 in order to achieve the desired selection of options, features or other information. Through the use of such a system 45, the driver is able to operate the vehicle and the various options and features therein without removing his hands from the steering wheel 50. Such a system provides for easier and safer operation of the vehicle.

It will be understood that the embodiments of the present invention which have been described herein are merely illustrative of an application of the principles of the present invention. Numerous modifications may be made by those skilled in the art without departing from the spirit and scope of the invention.

What I claim is:

1. An input device for moving a cursor on a computer display screen, said input device comprising
    (a) a keyboard, having a plurality of rows of depressible type keys oriented for general operation of said keyboard from an operator side of said keyboard, one of said rows containing home keys to which a user's hands normally return while operating said input device;
    (b) a first cursor positioning sphere rotatably mounted on said keyboard between said rows of type keys and said operator side of said keyboard to permit manual rotation of said first sphere by a thumb of the user while the user's fingers remain in contact with said home keys;
    (c) first sensing means connected with said first sphere for sensing the rotation thereof, said first sensing means generating first and second output signals corresponding with the magnitude and direction of the sensed rotation with respect to first and second perpendicular axes of said first sphere, respectively;
    (d) a second cursor positioning sphere rotatably mounted on said keyboard between said rows of type keys and said operator side of said keyboard to permit manual rotation of said second sphere by a thumb of the user while the user's fingers remain in contact with said home keys;
    (e) second sensing means connected with said second sphere for sensing the rotation thereof, said second sensing means generating third and fourth output signals each corresponding with the magnitude and direction of the sensed rotation with respect to first and second perpendicular axes of said second sphere, respectively, said first, second, third, and fourth output signals controlling the position of said cursor on the display screen, respectively, said first, second, and third output signals controlling cursor movement on the display screen along the X, Y, and Z axes, respectively, of the screen.

2. An input device as defined in claim 1, wherein at least one of said first and second axes of said second sphere are colinear with at least one of said first and second axes of said first sphere, respectively.

3. The input device of claim 1 wherein said keyboard includes at least one depressible command key mounted on said keyboard.

4. The input device of claim 3 wherein said first and second cursor positioning spheres are positioned adjacent each other and two command keys are positioned on the side of each cursor positioning sphere opposite the other cursor positioning sphere.

5. The input device of claim 4 wherein each said command key is positioned sot hat it can be depressed by one of the thumbs of the user while the user's fingers remain in contact with said home keys.

* * * * *